United States Patent [19]
Ueda

[11] Patent Number: 5,815,194
[45] Date of Patent: Sep. 29, 1998

[54] VIDEO-ON-DEMAND SYSTEM

[75] Inventor: Hiroaki Ueda, Tokyo, Japan

[73] Assignee: NEC Corporation, Tokyo, Japan

[21] Appl. No.: 597,193

[22] Filed: Feb. 6, 1996

[30] Foreign Application Priority Data

Feb. 9, 1995 [JP] Japan .................................... 7-021627

[51] Int. Cl.⁶ ...................................................... H04N 7/10
[52] U.S. Cl. .................................... 348/7; 348/12; 348/6; 455/5.1
[58] Field of Search ................................ 348/10, 11, 12, 348/13, 1, 6, 7; 455/6.2, 6.3, 4.2, 5.1, 6.1; H04N 7/10

[56] References Cited

U.S. PATENT DOCUMENTS

| | | | |
|---|---|---|---|
| 4,138,718 | 2/1979 | Toke et al. | 364/136 |
| 5,051,822 | 9/1991 | Rhoades | 348/10 |
| 5,341,474 | 8/1994 | Gelman et al. | 348/10 |
| 5,440,632 | 8/1995 | Bacon et al. | 348/12 |
| 5,517,502 | 5/1996 | Bestler et al. | 348/10 |
| 5,553,311 | 9/1996 | McLaughlin et al. | 348/10 |
| 5,557,317 | 9/1996 | Nishio et al. | 348/12 |
| 5,625,864 | 4/1997 | Budow et al. | 348/8 |
| 5,629,978 | 5/1997 | Blumhardt et al. | 348/7 |
| 5,635,979 | 6/1997 | Kostreski | 348/10 |
| 5,666,293 | 9/1997 | Metz et al. | 348/10 |

FOREIGN PATENT DOCUMENTS

| | | |
|---|---|---|
| 61-72438 | 4/1986 | Japan . |
| 1-208053 | 3/1988 | Japan . |
| 4-156194 | 5/1992 | Japan . |

*Primary Examiner*—John K. Peng
*Assistant Examiner*—Linus M. Lo
*Attorney, Agent, or Firm*—Sughrue, Mion, Zinn, Macpeak & Seas, PLLC

[57] ABSTRACT

In order to serve, to each of a plurality of client terminals, programs and data for selecting a video service while considering the memory capacity of the client terminals, client terminals of a video-on-demand system of the invention send information of their memory capacity together with a request for downloading video selection programs to a server station.

The server station downloads the video selection programs arranged into MPEG formatted data, step by step according to the memory capacity information and to the result of the program executed in each of the client terminals, providing an excellent graphical user interface making use of an ordinary bi-directional data transmission network.

5 Claims, 12 Drawing Sheets

F I G. 7
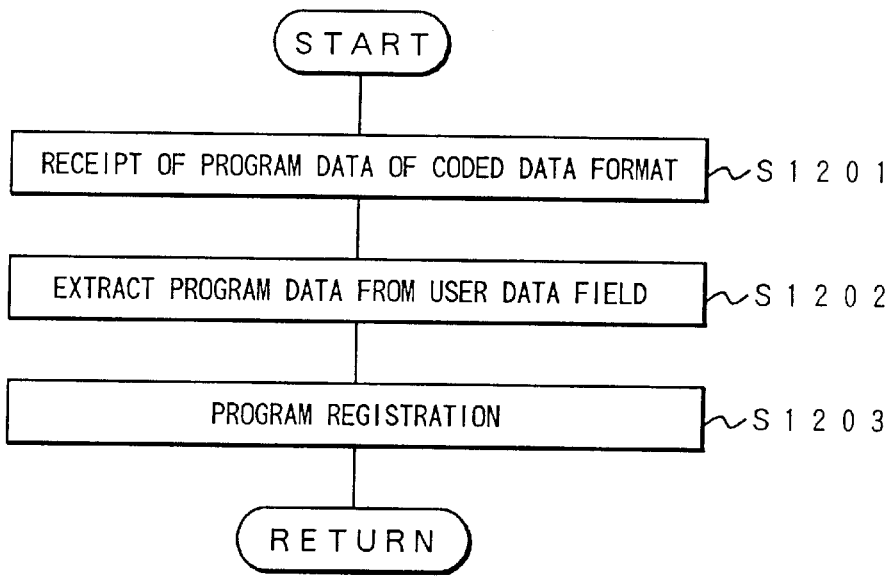
F I G. 8
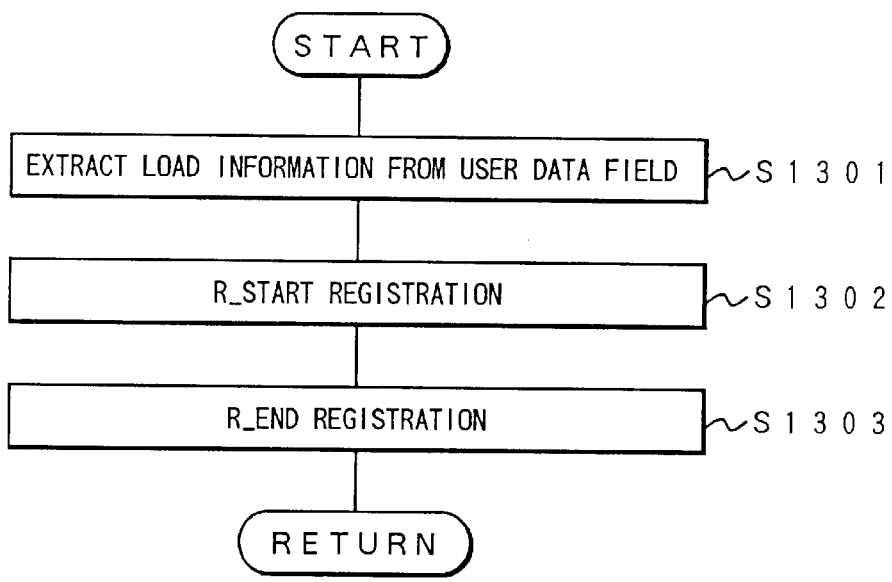

(GENRES TO BE SELECTED)

(TITLES TO BE SELECTED)

(VIDEO PICTURE REPRODUCED)

VIDEO-ON-DEMAND SYSTEM

BACKGROUND OF THE INVENTION

This invention relates to a video-on-demand system wherein a server station retrieves and delivers a video picture on demand of its client terminal through bi-directional data transmission network.

For video data communication through transmission cable, the video data are generally transmitted after they are converted to digital signals and a data compression technology such as JPEG (Joint Photographic coding Experts Group) or MPEG (Moving Pictures Expert Group) is applied because of the enormous amount of data to be transmitted. These technologies are adopted in TV-conference system or CATV system as well as the video-on-demand system.

FIG. 13 illustrates a hardware composition of a conventional video-on-demand system networked with bi-directional transmission cable. A client terminal 11 is shown in the left part and a server station 21 in the right part of the FIG. 13. The client terminal 11 is equipped with terminal control means 12 composed of a CPU, which controls video selecting means 13, a terminal communication unit 14, a terminal memory 15 and a video signal decoder 16.

With the video selecting means 13, a user inputs commands for looking up and selecting a desired video picture. The terminal communication unit 14 exchanges data with the server station 21 through a transmission network 31 and receives coded data of the selected video picture. The coded data delivered from the server station 21 are stored in the terminal memory 15 to be decoded by the video signal decoder 16.

In the server station 22, there are also provided server control means 22 composed of a CPU for controlling a server communication unit 23, a server memory 24 and a coded data storing unit 25. The server communication unit 23 is connected to the transmission network 31 and communicates with the client terminal 11. The server memory 24 stores the coded data of the video picture selected by the user among files prepared in the coded data storing unit 25 temporarily for delivering to the client terminal 11.

In a video-on-demand system as described, the server communication unit 14 transmits a command to the server station 21 through the transmission network 31 for demanding a video picture which is designated by the user. Then the server station 22 retrieves the demanded video data from the coded data storing unit 25 for delivering to the client station 11 through the server communication unit 23. The video data received by the client terminal 11 are stored in the terminal memory 15 and video signals are reproduced by the video signal decoder 16 from the coded data.

From FIG. 14 to FIG. 17, an example of a transition of the pictures displayed on the client terminal 11 for selecting a video picture is illustrated. In a menu picture 41 shown in FIG. 14, there are displayed a video service button (a pictogram or an icon) 42 for selecting a video picture, a TV service button 43 for selecting a TV broad cast and a game service button 44 for selecting a game service. A user selects the desired button by a pointing device (which is not shown in FIGs) or another input device. Assume that the video button 42 is selected here.

FIG. 15 is a picture 46 displayed after the video button 42 is pointed, wherein a part around the video button 42 of the picture 41 is enlarged into the picture 46 displaying buttons 47 for selecting a genre of video pictures among a romance, a comedy, etc. FIG. 16 is a picture 48 for designating a title of a video picture of the selected genre. The user selects one of the title buttons 49 displayed on the picture 48 and points a play button 50. Thus, a video picture of the designated title is displayed on a picture 51 as illustrated in FIG. 17.

As described, a graphical user interface technology is applied for providing user's easy selection. So, many graphic pictures are to be displayed for selecting a video picture. Furthermore, there are various kinds of services in a video-on-demand system as shopping information, video pictures or video games. Therefore, a certain number of procedures or programs should be prepared for a selection by way of the video selecting means 13 of FIG. 13. And in case these procedures or programs are prepared in the video selecting means 13, they must be maintained and revised whenever a new service is entered, for example. This is a problem.

Some measures are taken to deal with the problem. Providing these procedures or programs in the server station 21, they may be delivered to the client terminal 11 when they are revised, for example. And, in the case, it is preferable that the revised procedures or programs are delivered without any special circuit nor special protocol.

There is a proposal (called a first prior art) disclosed in a Japanese patent application laid open as a Provisional Publication No. 156194/'92 for transmitting data of a different kind using an existing communication system. In the proposal, data of a moving picture are transmitted through a still picture transmission system by reducing data of certain number of pixels and certain number of frames of the moving picture. In another Japanese patent application laid open as a Provisional Publication No. 72438/'86 (called a second prior art), digital data are delivered inserted in blank intervals of an analog video signal without a using special circuit. And in still another Japanese patent application laid open as a Provisional Publication No. 208053/'89 (called a third prior art), multi-media data are transmitted through a cable by using multi-protocols, each of which corresponding to each of the multi-media.

The first prior art disclosed in the Provisional Publication No. 156194/'92 is efficient for transmitting picture data which can be reproduced by data interpolation. For transmitting procedure data or program data, the proposal can not be applied since these data can not be reproduced when they are thinned out. In the second and the third prior art, procedure data or program data can be transmitted, but there are needed analog data transmission lines or special protocols and so, public data communication networks commonly used are not available and furthermore, there is no means for the server station 21 to know the memory capacity of the client terminal 11. Therefore, it may occur that procedure data or program data exceeding the capacity of the terminal memory 15 be delivered, and as a result, the client terminal 11 could not execute them correctly because of the data overflow.

SUMMARY OF THE INVENTION

Therefore, a primary object of the present invention is to provide a video-on-demand system wherein data of procedures or programs for a client terminal designating a video picture may be delivered through an ordinary data transmission network without any special protocol, and to provide a video-on-demand system wherein the data of procedures or programs may be delivered step by step from a server station in accordance with memory capacity of each client terminal.

In order to achieve the object, a video-on-demand system of the present invention which has client terminals connected with a server station for delivering various video information services to the client terminals through a bi-directional data transmission network, comprises:

a terminal memory provided in one of the client terminals for storing data of at least one of programs used for user's designation of a video information service;

program sending means provided in the server station for downloading said at least one of programs to said one of the client terminals through the bi-directional transmission network;

download means provided in said one of the client terminals for storing said at least one of programs downloaded from said program sending means in said terminal memory; and executing means provided in said one of the client terminals for executing said at least one of programs for a user designating one of the various video information services to be delivered and sending a request for said one of the various video information services designated by said user to the server station.

Therefore, users of a video-on-demand system of the invention can look up and designate an available video information service always among nearest revised data with the newest program, without providing any other special transmission line.

Furthermore, said program sending means of the video-on-demand system of the invention prepares data of said at least one of programs for downloading according to a format standardized for a compressed data transmission and used the video-on-demand system for delivering said various video information services.

Therefore, the video-on-demand system of the invention can make use of an ordinary bi-directional transmission network, without using any special protocol.

And still further in the video-on-demand system of the invention, said one of the client terminals comprises a terminal communication unit for informing memory capacity information indicating an available memory capacity of said terminal memory to the server station, and the server station controls a number of programs to be downloaded at once of said at least one of programs in accordance with said memory capacity information.

Therefore, even a client terminal has not but a small terminal memory, a complicated procedure can be executed by downloading programs step by step according to the memory capacity of the client terminal.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

FIG. 7 illustrates controls in the download means 103 of the client terminal 101 of FIG. 1.

FIG. 8 shows controls in the load analysis means 105 of FIG. 1.

DETAILED DESCRIPTION OF THE PREFERRED EMBODIMENTS

Figure 1:
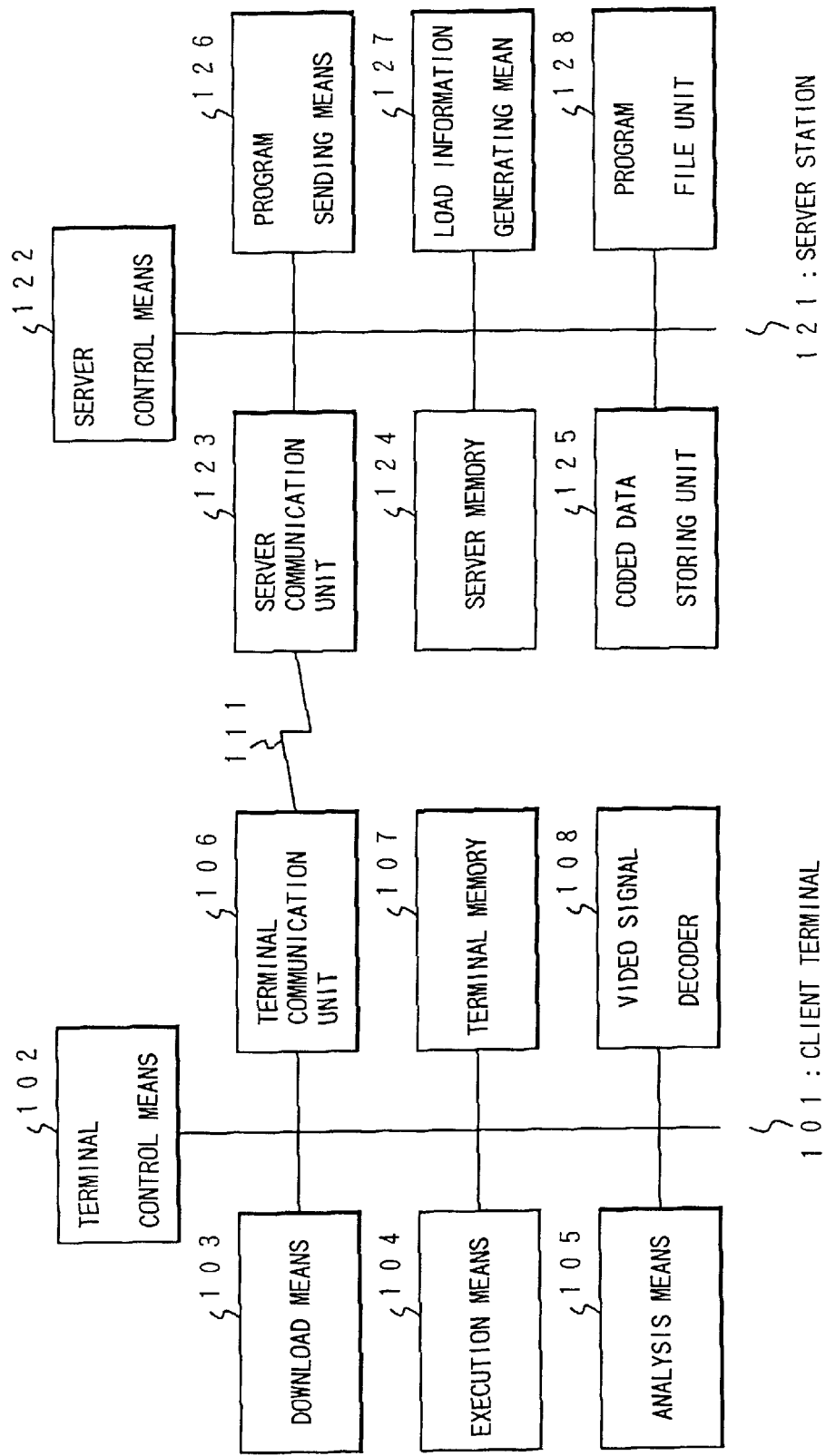
FIG. 1 illustrates outline of a video-on-demand system of an embodiment of the present invention.

FIG. 1 illustrates an outline of a video-on-demand system of an embodiment of the present invention.

In a client terminal 101, there are provided terminal control means 102 having a CPU, which controls download means 103 for extracting procedure data or program data from received data, execution means 104 for executing the procedures or the programs extracted, analysis means 105 for analyzing the procedure data or program data extracted, a terminal communication unit 106 for communicating with a server station 121 through a data transmission network 111, a terminal memory 107 for temporary storage of coded video data or variables used in the client terminal 101, and a video signal decoder 108 for decoding coded video data delivered.

A server station 121 also comprises a server control means 122 having a CPU, which controls a server communication unit 123 for communicating with the client terminal 101 through the data transmission network 111, a server memory 124 for storing the coded data of the video picture selected by the user or variables used in the server station 121, a coded data storing unit 125 for storing coded data files of various video pictures, program sending means 126 for preparing procedure data, program data or video data demanded from the client terminal 101, load information generating means 127 for preparing information data concerning to download programs, and program file unit 128 for storing program files to be downloaded for the video selection.

The client terminal 101 and the server station 121 communicate with each other through the terminal communication unit 106 and the server communication unit 123 connected to both ends of the data transmission network 111. The server station 121 retrieves an appropriate program from the program file unit 128 for downloading to the client terminal 101 by way of the load information generating means 127 and the program sending means 126. In the client terminal 101, delivered data are analyzed by the analysis means 105, and programs are extracted by the download means 103 and executed by the execution means 104.

Figure 2:
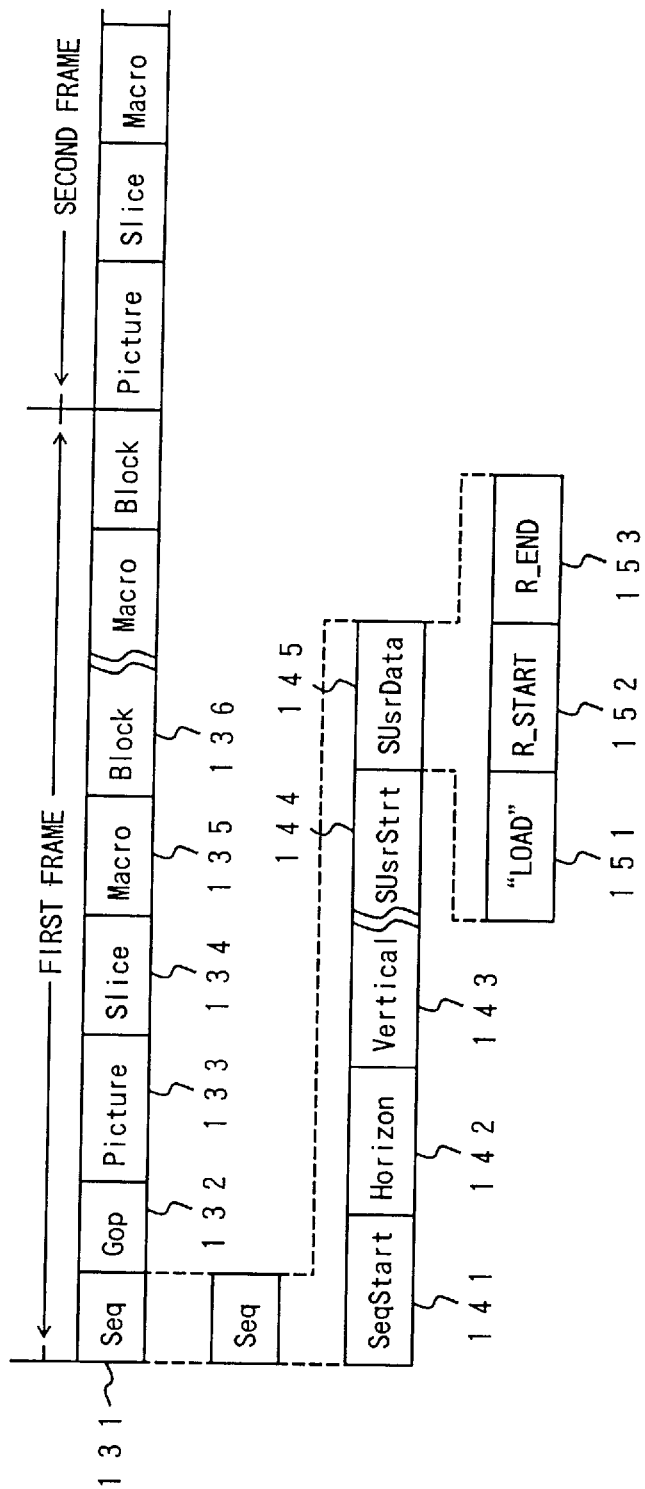
FIG. 2 shows a coding format of a compressed data according to the MPEG system.

FIG. 2 shows a coding format of a compressed data according to the MPEG system. The coded data of the embodiment is described to have a same format with the MPEG system including a sequence header (abbreviated to Seq) 131, a Group of picture header (GOP) 132, a Picture header 133, a Slice header 134, a Macro block header 135 and a code block (Block) 136, as shown in FIG. 2.

The sequence header 131 comprises a sequence start code (SeqStart) 141 indicating beginning of the sequence header, a horizontal size value (Horizon) 142 indicating a number of pixels in x-direction, a vertical size value (Vertical) 143 indicating a number of lines in y-direction and a sequence user data start code (SUsrStrt) 144 indicating the existence of subsequent sequence user data (SUsrData) 145.

The SUsrData 145 is reserved for optional use and here, a load information flag is inserted in the embodiment. The load information flag is composed of a "Load" indicator 151, a beginning sequential number (R_Start) 152 of the first program and an ending sequential number (R_End) 153 of the last program.

Figure 3:
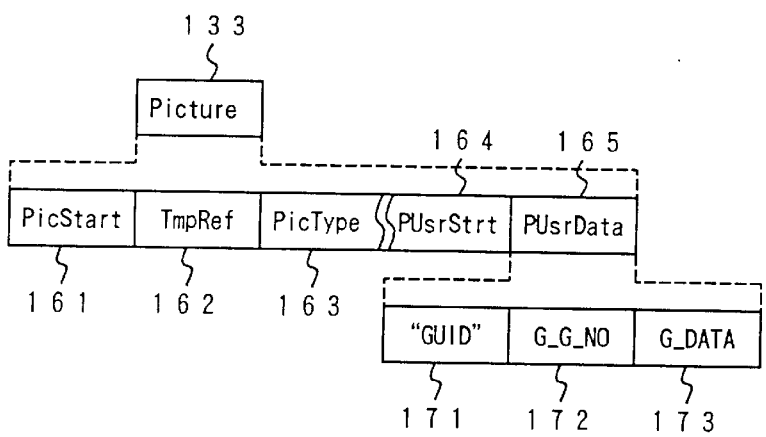
FIG. 3 shows format of the picture header 133 of FIG. 2.

Format of the picture header 133 is shown in FIG. 3, which comprises a picture start code (PicStart) 161 of the picture header, a temporal reference (TmpRef) 162 indicating displaying order of the picture, a picture user data start code (PUsrStrt) 164 indicating existence of picture user data (PUsrData) 165 following. The PUsrData 165 is reserved optional use and a program flag is inserted here in the embodiment. The PUsrData 164 is composed of a "Guid" indicator 171, sequential number (G_No) 172 of the program and the program data (G_Data) 173 themselves following.

In connection with FIG. 2 and FIG. 3, the embodiment is described assuming that the MPEG system is applied therein, but it goes without saying that other data compression system may be applied within the scope of the invention.

Figure 4:
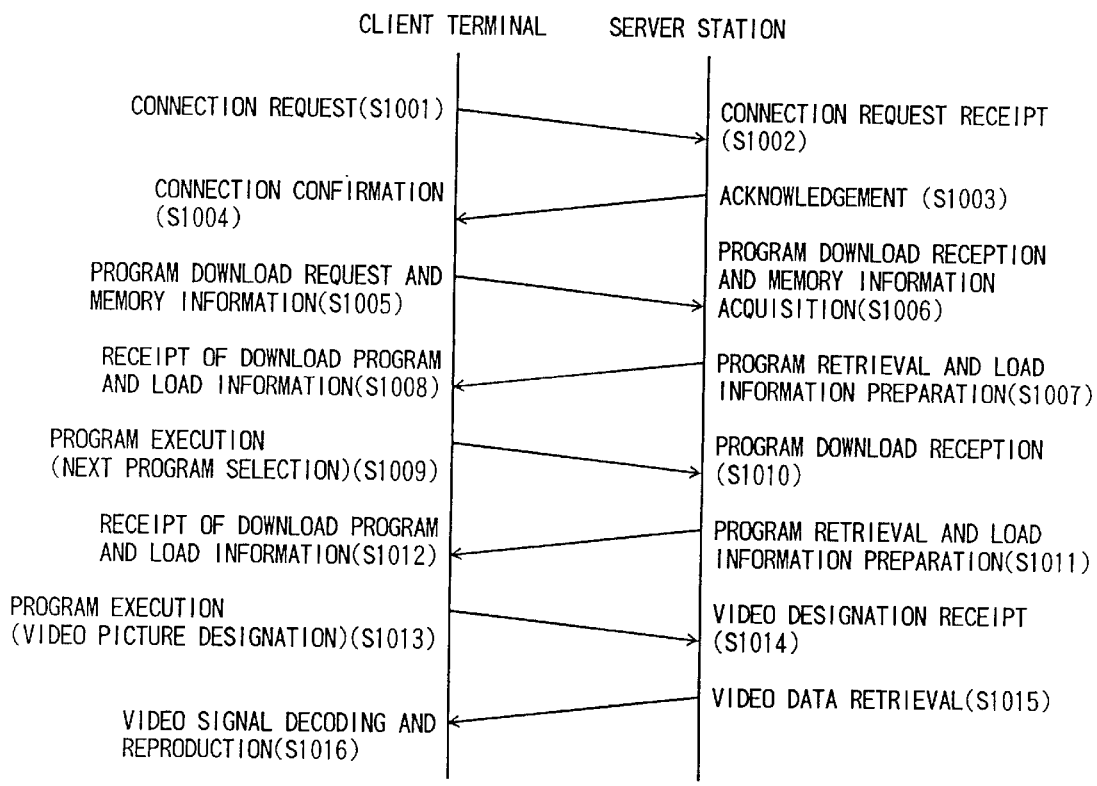
FIG. 4 illustrates communication steps between a client terminal 101 and the server station 121 of FIG. 1.

FIG. 4 illustrates communication steps between a client terminal 101 and the server station 121 of FIG. 1.

A user sends a command requesting a connection to the server station 121 from the client terminal 101 (at step S1001). Receiving the command (at step S1002), the server station 121 sends a response acknowledging the connection (at step S1003). The client terminal 101 confirms the connection by the receipt of the response (at step S1004). Then the client terminal 101 sends a command requesting program download together with information of its own memory capacity (at step S1005).

Receiving the command for program download and the memory capacity information (at step S1006), the server station 121 retrieves a corresponding program and sends the program arranged into the user data fields according to the compressed data format above described together with load information to the client terminal 101 (at step S1007).

The client terminal 101 extracts the programs and the load information from the delivered data arranged according to the compressed data format and executes the programs (at step S1008). Then the client terminal sends a command requesting a second download of a program determined to be executed next time (at step S1009). Receiving the command (at step S1010), the server station 121 retrieves a program to be executed next time for sending to the client terminal 101 arranged into the format together with load information (at step S1011). From the received data (at step S1012), the second programs and a menu information are extracted and executed by the client terminal 101 for selecting and designating a video picture (at step S1013).

In an example described, the client terminal 101 selects the desired video picture by executing two blocks of programs divided and delivered into two portions in accordance with the memory capacity.

The designation of the video picture is checked (at step S1014) by the server station 121 and the compressed data of the designated video picture are taken and sent out (at step S1015) to the client terminal 101, where they are decoded and reproduced (at step S1016).

Now, outline processes of an embodiment of the present invention have been described. In the following paragraphs, detailed processes of the video picture designation programs will be described.

Figure 5:
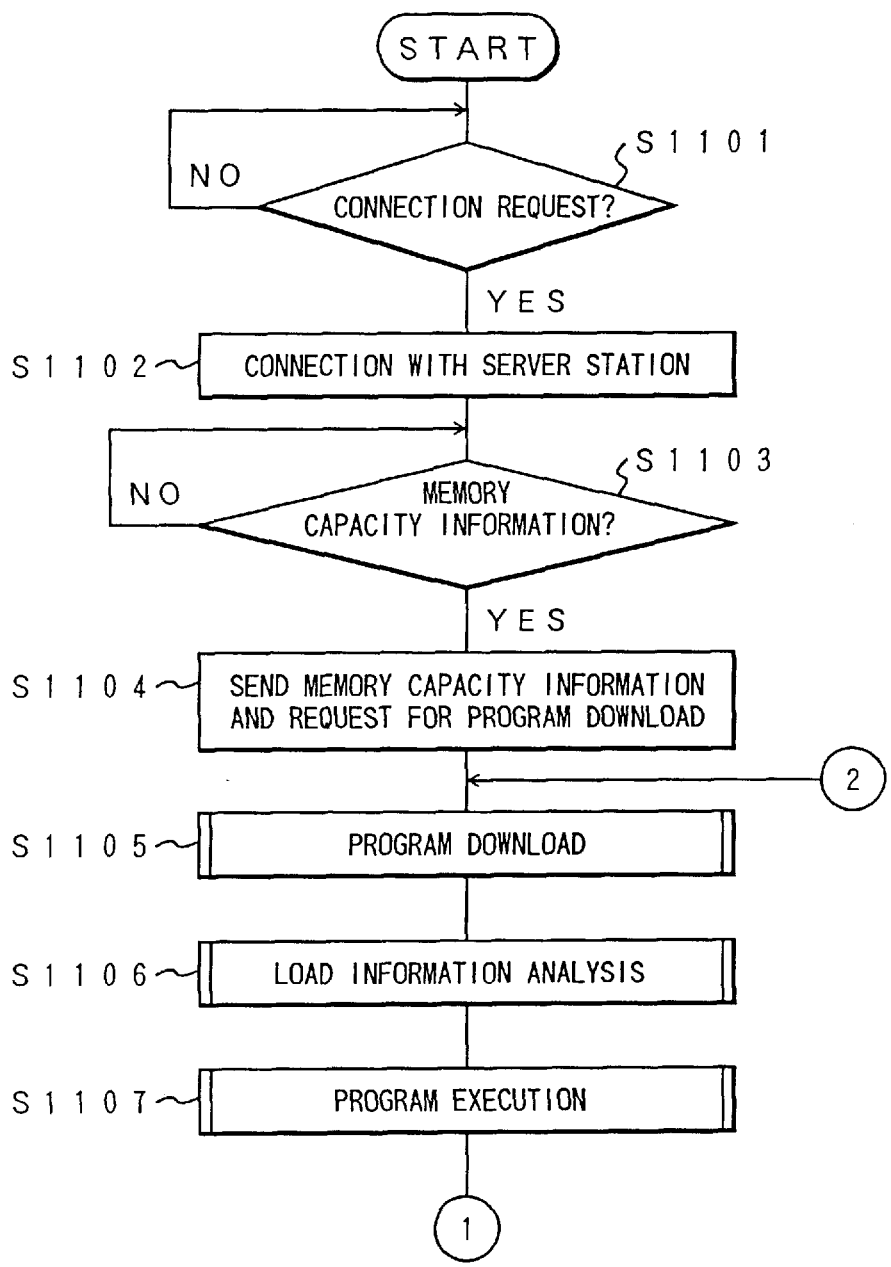
FIG. 5 is a flow chart illustrating processes from the step S1001 to the step S1009 of FIG. 4.

FIG. 5 is a flow chart illustrating processes from the step S1001 to the step S1009 of FIG. 4.

When the terminal communication unit 106 of FIG. 1 is commanded to request a connection (at step S1101; Y), it establishes the connection between the server station (at step S1102). The terminal communication unit 106 sends a command for a program download together with memory capacity information (at step S1104) after informed (at step S1103) of the memory capacity (for storing the download programs from the server station 121) confirming receipt of a connection acknowledgment. Then, the reception of the download program (at step S1105) is followed by load information analysis (at step S1106) and program execution (at step S1107).

Figure 6:
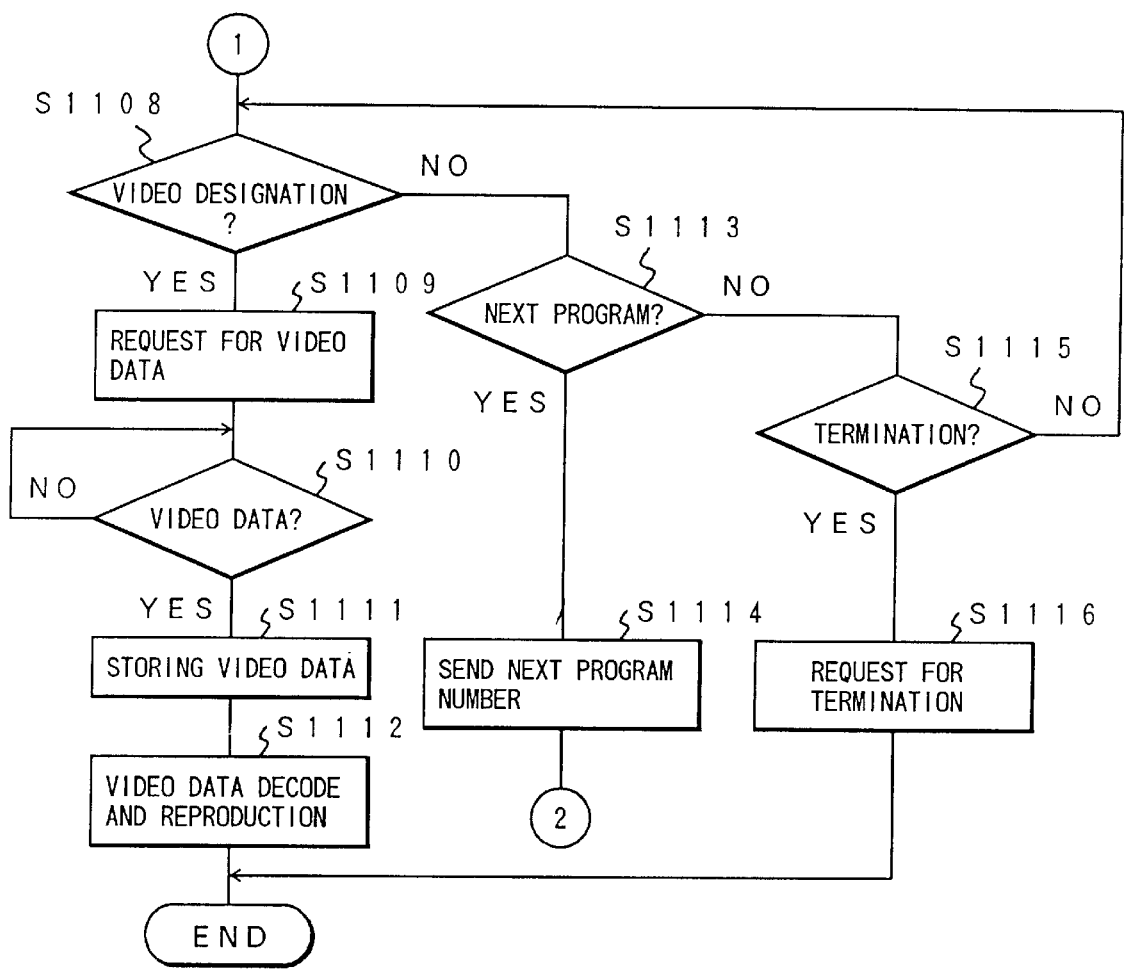
FIG. 6 shows flows of processes following the step S1107 of FIG. 5 according to user's choices.

FIG. 6 shows the flow of processes following the step S1107 of FIG. 5 according to the user's choices. In case a video picture is designated at step S1013 of FIG. 4 (at step S1108; Y), the terminal communication unit 106 sends a command to the server station 121 for requesting the designated video picture (at step S1109) and waits (at step S1110) until compressed data of the video picture are delivered (Y), which are stored temporarily in the terminal memory 107 of FIG. 1 (at step S1111) and read out to be decoded and reproduced by the video signal decoder 108 of FIG. 1 (at step S1112).

In case a next data is demanded as a result of the step S1107 of FIG. 5 (at step S1113), the terminal communication unit 106 sends a program number to be executed next time to the server station 121 (at step S1114) and the control returns to the step S1105 of FIG. 5. Thus, only necessary programs are downloaded from the server station 121.

When the termination of the process is chosen as a result of the step S1107 of FIG. 5, the terminal communication unit 106 sends a command requesting an end procedure (at step S1116) for terminating the processes (at END).

FIG. 7 illustrates controls in the download means 103 of the client terminal 101 of FIG. 1, which receives program data delivered according to the compressed data format (at step S1201) and extracts the program from a user data field, the PUsrData 165 for example, of the format data (at step S1202). The extracted program is registered in the terminal memory 107 (at step S1203).

Controls in the load analysis means 105 is shown in FIG. 8, which extracts the load information from a user data field, the SUsrData 145 for example, of the delivered data (at step S1301) and registers the beginning sequential number R_Start 152 of the first program and the ending sequential number R_End 153 of the last program in the terminal memory 107 (at step S1302).

Figure 9:
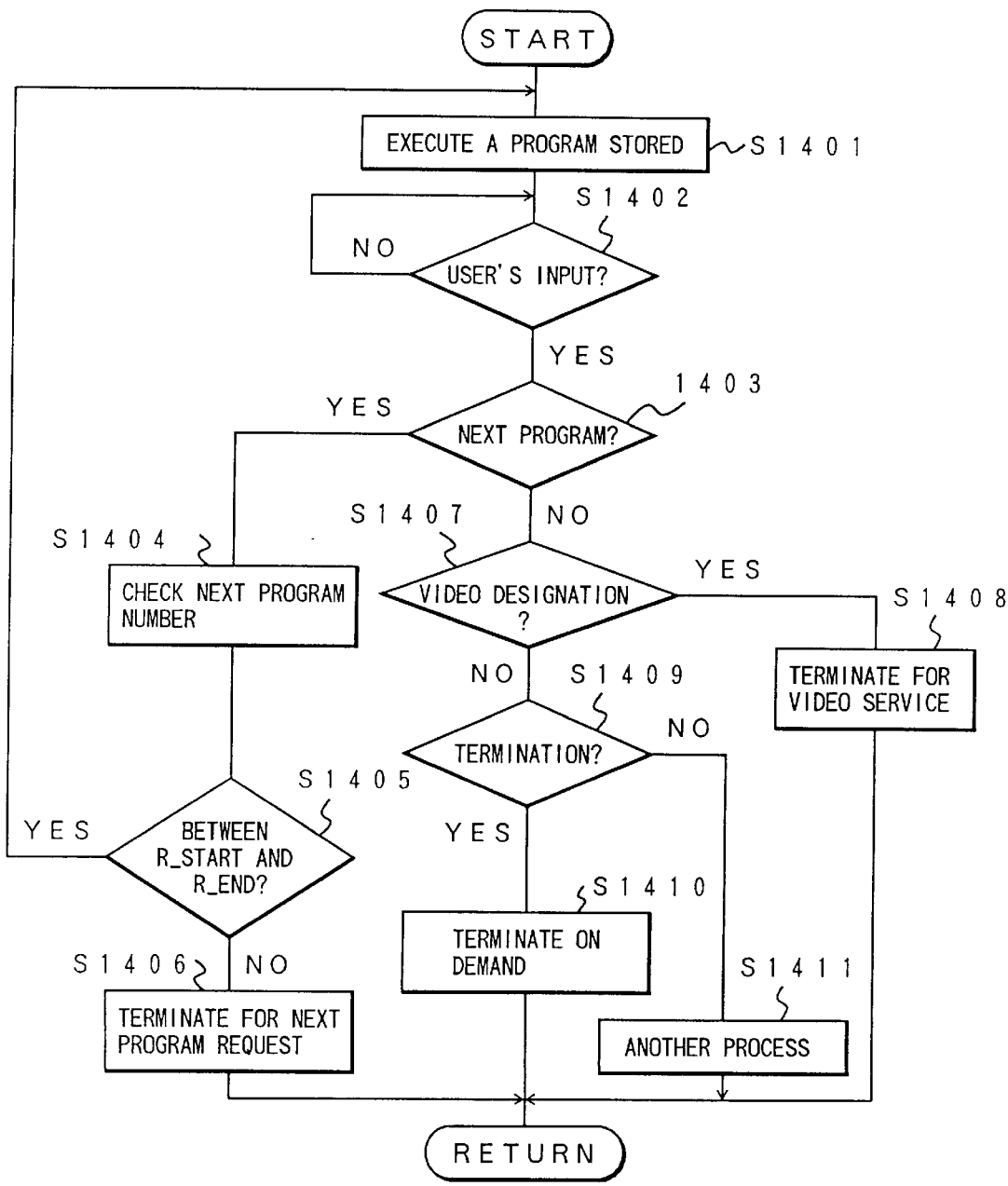
FIG. 9 illustrates flows of controls in the execution means 104 of FIG. 1.

FIG. 9 illustrates the flow of controls in the execution means 104, which executes one of the programs registered in the terminal memory 107 (at step S1401) and waits for a user's input (at step S1402; Y).

In case a next program is required by the user's input (at step S1403; Y), the execution means 104 checks if the program number to be executed next time is within a value between the beginning sequential number R_Start 152 and the ending sequential number R_End 153 (at step S1404) and, when within the value (at step S1405; Y), executes the next program returnning to the step S1401 and otherwise terminates the process for requesting a next program download.

While, in case a video picture is designated by the user's input (at step S1407), the execution means 104 terminates the procedure for sending a command requiring the designated video picture (at step S1408). The program execution is also terminated (at step S1410) when an END request is input by a user (at step S1409; Y) and otherwise it is transferred to another process.

Now, controls in the server station 121 for delivering the program will be described.

Figure 10:
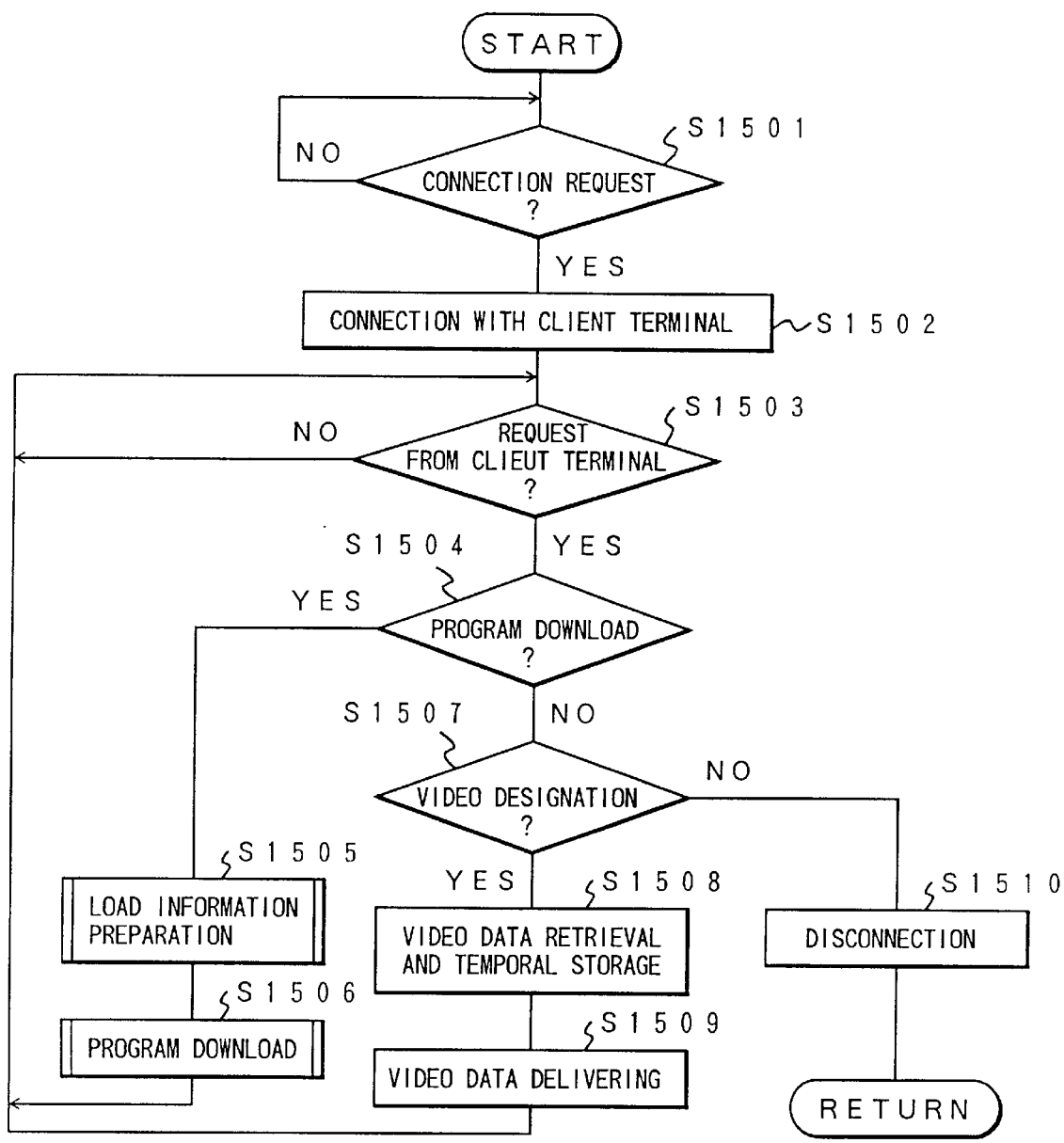
FIG. 10 is a flow chart illustrating controls in the server control means 122 of FIG. 1.

FIG. 10 is a flow chart illustrating controls in the server control means 122, which watches a connection request from the client terminal 101 as shown in FIG. 4 (at step S1501). Receiving the request (Y), the server communication unit 123 sends a reply of acknowledgment for establishing the connection (at step S1502) and waits for a next request from the client terminal 101 (at step S1503).

When a request for a program download is received (at step S1504), load information is prepared (at step S1505) and sent to the client terminal together with a program (at step S1506). Then the control is returned to the step S1503 for waiting a next request from the client terminal 101.

When a request for a video picture service is received (at step S1507; Y), compressed data of the designated video picture are retrieved from the coded data storing unit 125 and stored in the server memory 124 (at step S1508), which are delivered to the client terminal 101 (at step S1509) and the control is returned to the step S1503.

In case the received command from the client terminal 101 is neither program download nor video picture service (at the step S1507; N), the connection between the client terminal 101 is cut, the control returning to the step S1501.

Figure 11:
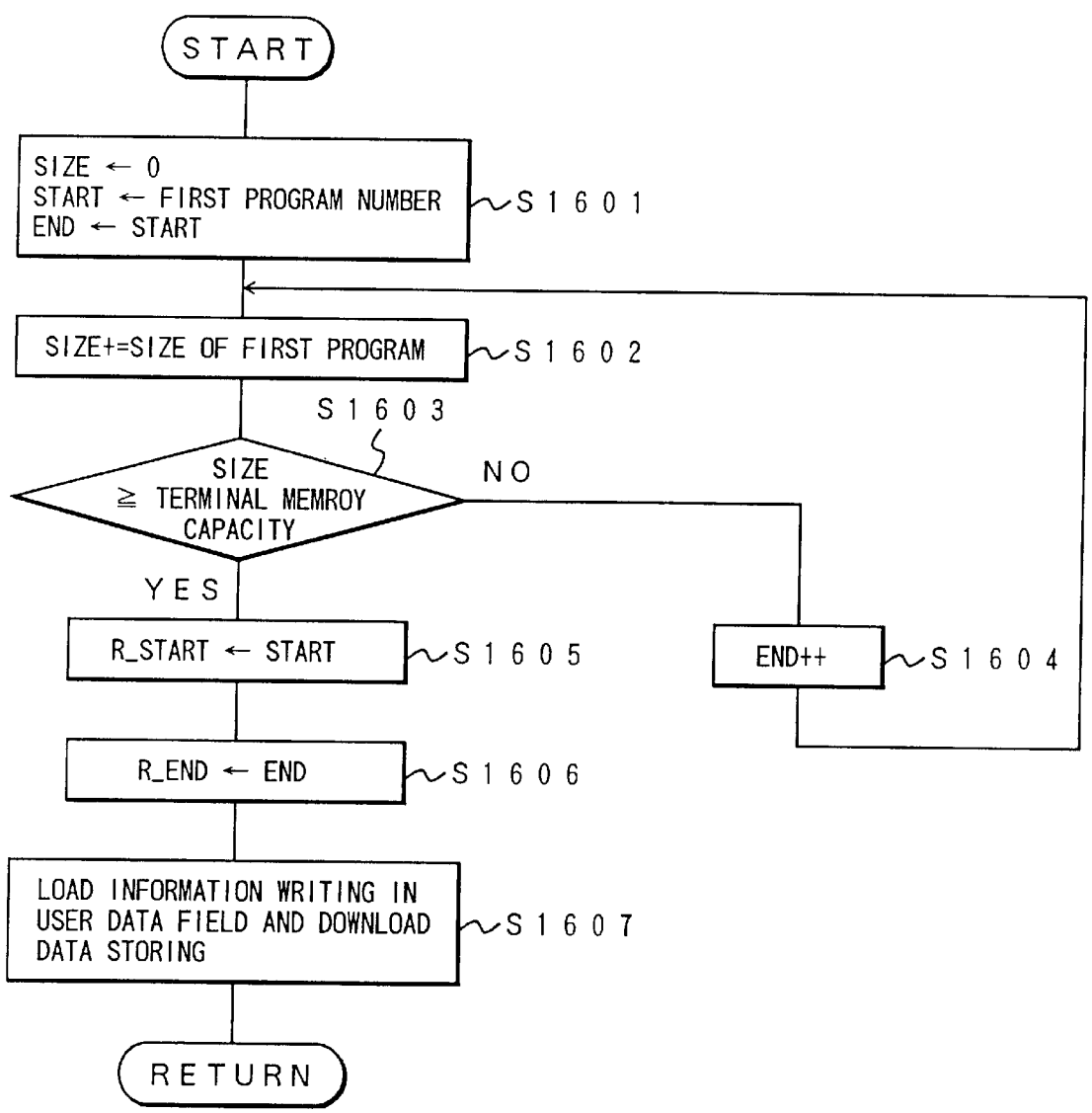
FIG. 11 illustrates controls in the load information generating means 127 of FIG. 1.

Controls in the load information generating means 127 are illustrated in FIG. 11, wherein initializing a variable "size" to 0, a variable "start" and a variable "end" are substituted with a program number to be executed for the first time (at S1601).

Then, a size of the program indicated by the variable "start" is added to the variable "size" (at step S1602) and the control returns to the step S1601 after adding 1 to the variable "end" (at step S1604) when the value of the variable "size" remains lower than the memory capacity reported of the client terminal 101 (at step S1603; N).

When the value of the variable "size" exceeds the memory size (at the step S1603; Y), the values of the variables "start" and "end" are stored in the beginning sequential number R_Start 152 and the ending sequential number R_End respectively of the load information (at step S1605, S1606). Then, the load information is inserted into a user data field, the SUsrData 145 for example, of format data to be stored in the server memory 124 (at step S1607).

Figure 12:
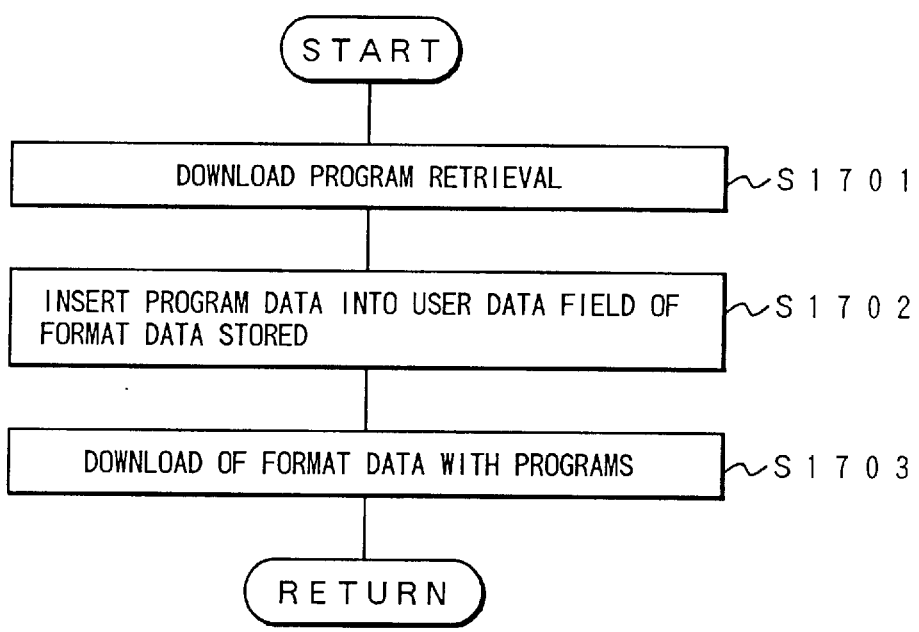
FIG. 12 shows controls in the program sending means 126 of FIG. 1.
Figure 13:
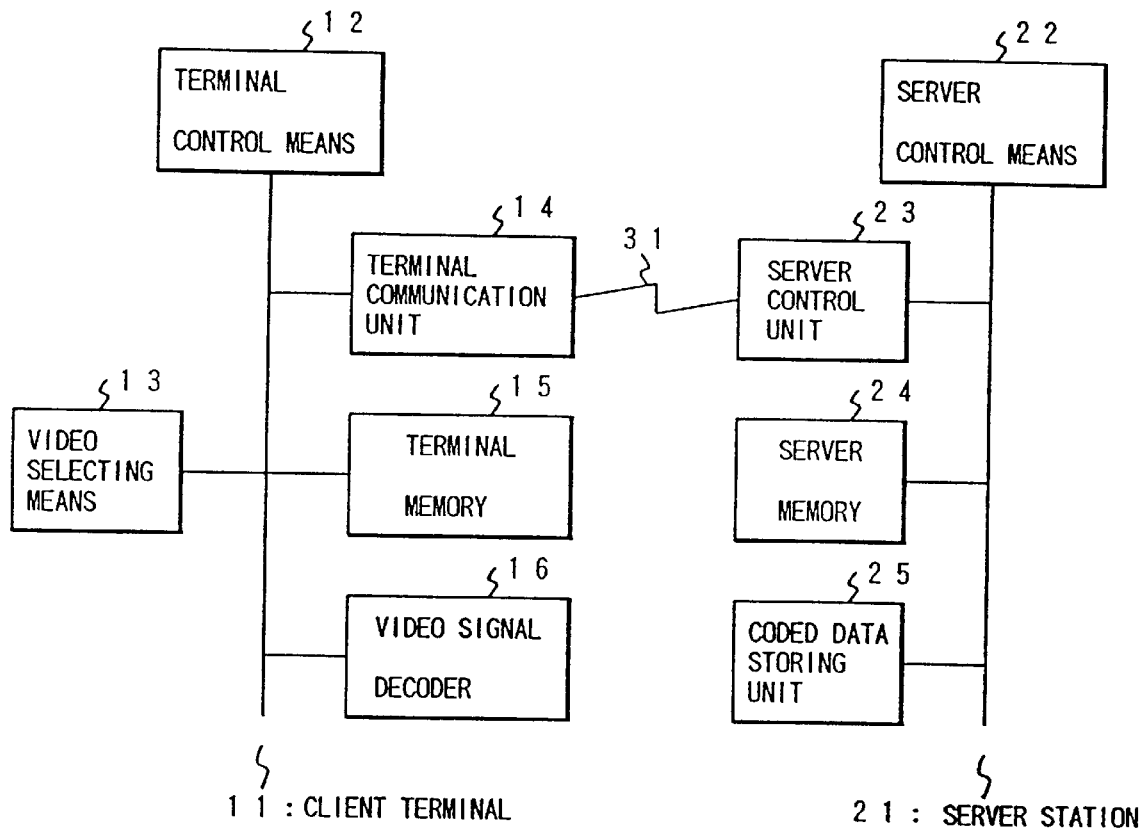
FIG. 13 illustrates a hardware composition of a conventional video-on-demand system networked with bi-directional transmission cable.
Figure 14:
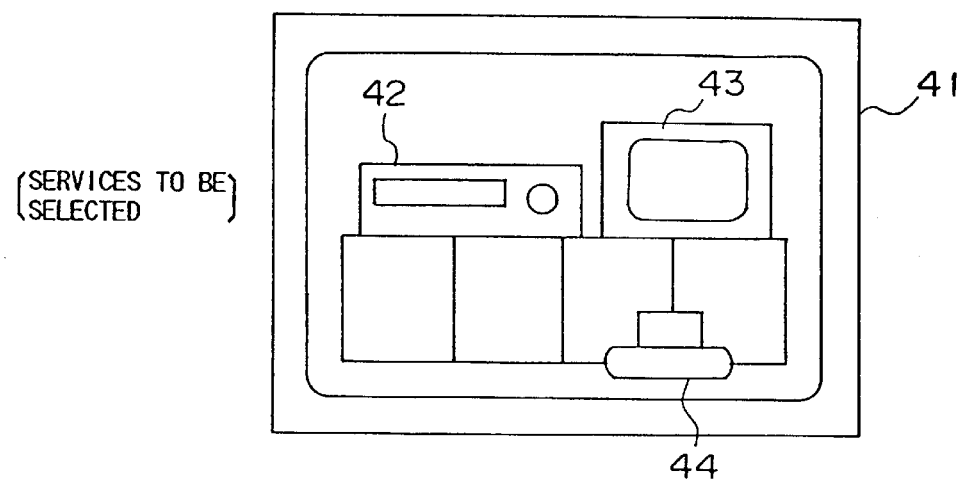
FIG. 14 shows an example of a menu picture 41 of a video-on-demand system.
Figure 15:
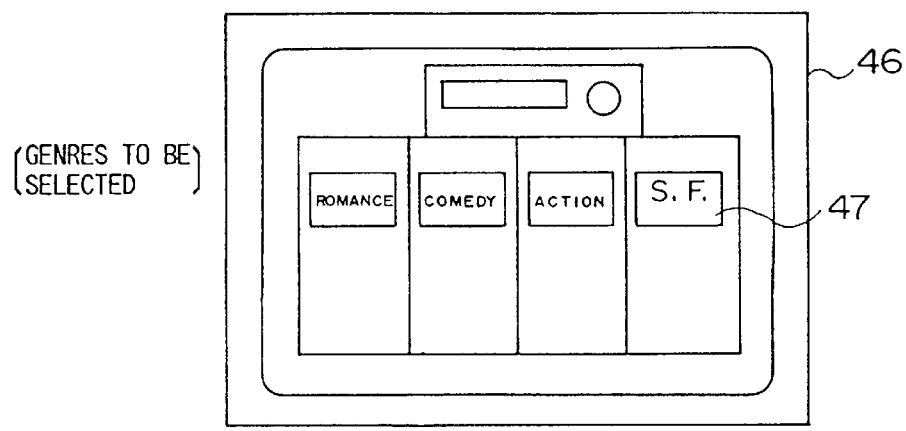
FIG. 15 shows a picture 46 displayed after the video button 42 of FIG. 14 is pointed.
Figure 16:
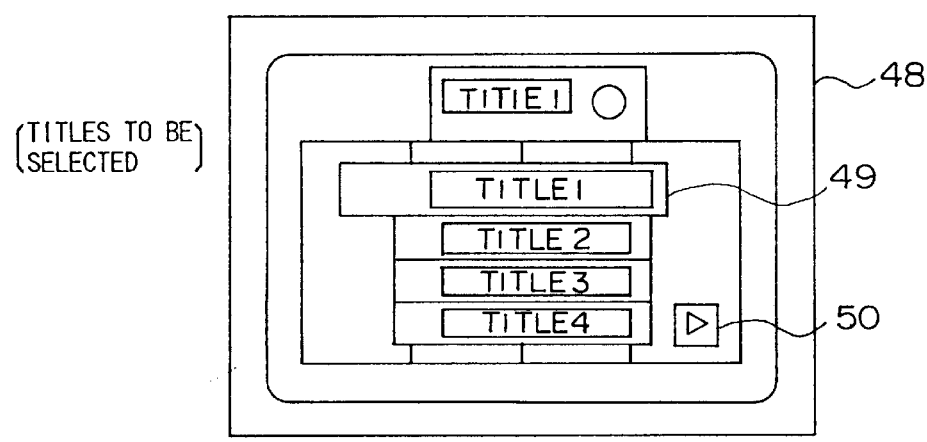
FIG. 16 shows a picture 48 for designating a title of a video picture.
Figure 17:
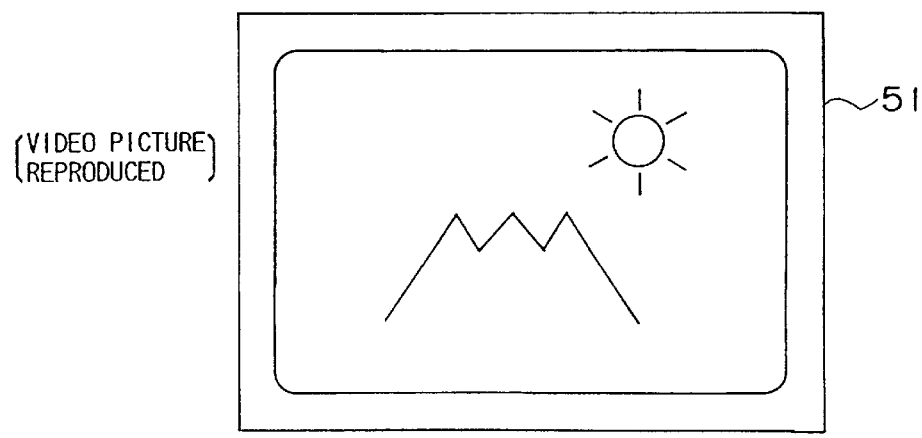
FIG. 17 illustrates a video picture of the selected title displayed on a picture 51.

Controls in the program sending means 126 of the server station 121 is shown in FIG. 12. Retrieving programs to be downloaded from the program file unit 128 (at step S1701) and inserting them into a user data field, PUsrData 165 for example, of the format data stored in the server memory 124 at the step S1607 of FIG. 11 (at step S1702), the program sending means 126 sends the download data to the client terminal 101 through the server communication unit 123.

Thus, the size of the programs in the download data is controlled always within the memory capacity of the client terminal 101.

What is claimed is:

1. A video-on-demand system having client terminals connected with a server station for delivering video information services to the client terminals through a bi-directional data transmission network, comprising:

a terminal memory provided in each of the client terminals for storing data, including at least one program used for a user's designation of a video information service;

a program sending means provided in the server station for downloading programs and video data, to any one of the client terminals through the bi-directional transmission network, wherein said server station confirms, before downloading, that said one of the client terminals includes a download means, such confirmation being achieved by receiving memory capacity information from said one of the client terminals; and an executing means provided in each of the client terminals for executing said at least one program and sending a request for a video information service designated by said user to the server station.

2. A video-on-demand system recited in claim 1, characterized in that said program sending means prepares data of said at least one of programs for downloading into a format standardized for delivering said various video information services.

3. A video-on-demand system recited in claim 2, wherein said format is standardized for a compressed data transmission and data of said at least one of programs are prepared in at least one of fields reserved for user data of data arranged according to said format.

4. A video-on-demand system having client terminals connected with a server station for delivering video information services to the client terminals through a bi-directional data transmission network, comprising:

a terminal memory provided in each of the client terminals for storing data including at least one program used for a user's designation of a video information service;

a program sending means provided in the server station for downloading programs and video data to any one of the client terminals through the bi-directional transmission network, wherein said server station confirms, before downloading, that said one of the client terminals includes a download means, such confirmation being achieved by receiving memory capacity information from said one of the client terminals; and an executing means provided in said one of the client terminals for executing said at least one program and sending a request for a video information service designated by said user to the server station; each of the client terminals comprising a terminal communication unit for informing said server station of said memory capacity of said terminal memory so the server station can control a number of programs to be downloaded at once in accordance with said memory capacity information.

5. A video-on-demand system having client terminals connected with a server station for delivering video information services to the client terminals through a bi-directional data transmission network, comprising:

a terminal memory provided in each of the client terminals for storing data including at least one program used for a user's designation of a video information service;

a program sending means provided in the server station for downloading programs and video data to any one of the client terminals through the bi-directional transmission network, wherein said server station confirms, before downloading, that said one of the client terminals includes a download means, such confirmation being achieved by receiving memory capacity information from said one of the client terminals; and an executing means provided in said one of the client terminals for executing said at least one program and sending a request for a video information service designated by said user to the server station, wherein said program sending means sends at least one other program than said at least one program upon receipt of a download request from said one of the client terminals.

* * * * *